US005245218A

United States Patent [19]

Rinderle et al.

[11] Patent Number: 5,245,218

[45] Date of Patent: Sep. 14, 1993

[54] ELECTRIC CIRCUIT FOR STABILIZING THE TRANSFER IMPEDANCE OF AN INTEGRATED CIRCUIT

[75] Inventors: Heinz Rinderle, Heilbronn; Rolf Bohme, Bad Friedrichshall; Gunter Gleim; Elke Rosch, both of Villingen-Schwenningen, all of Fed. Rep. of Germany

[73] Assignee: Deutsche Thomson Brandt GmbH, Villingen-Schwennigen, Fed. Rep. of Germany

[21] Appl. No.: 840,911

[22] Filed: Feb. 7, 1992

[30] Foreign Application Priority Data

Jul. 27, 1989 [DE] Fed. Rep. of Germany ....... 3924804

[51] Int. Cl.[5] .............................................. H02J 1/04

[52] U.S. Cl. ....................................... 307/60; 307/82; 363/73; 323/293; 323/349

[58] Field of Search ....................... 323/349, 350, 293; 307/52, 82, 60, 83, 70; 363/73

[56] References Cited

U.S. PATENT DOCUMENTS

| | | | |
|---|---|---|---|
| 3,956,638 | 5/1976 | Ahrens et al. | 307/48 |
| 3,986,101 | 10/1976 | Koetsch et al. | 323/20 |
| 4,074,146 | 2/1978 | Buonavita | 307/60 |
| 4,618,779 | 10/1986 | Wiscombe | 307/60 |

FOREIGN PATENT DOCUMENTS 659156 12/1986 Switzerland .

*Primary Examiner*—Steven L. Stephan
*Assistant Examiner*—Adolf Berhane
*Attorney, Agent, or Firm*—J. S. Tripoli; E. P. Herrmann; L. L. Hallacher

[57] ABSTRACT

A system for regulating the transfer impedance of a plurality of current-to-voltage converters to a substantially equal value includes a reference voltage source and a reference impedance for providing a reference current. A reference current-to-voltage converter is responsive to the reference current and provides an output voltage. A comparator is responsive to the reference voltage and the output voltage and provides a control signal to the reference current-to-voltage converter and to all the other current-to-voltage converters to maintain the transfer impedance of all the current-to-voltage converters constant.

3 Claims, 4 Drawing Sheets

ELECTRIC CIRCUIT FOR STABILIZING THE TRANSFER IMPEDANCE OF AN INTEGRATED CIRCUIT

This is a continuation of PCT application PCT/EP 90/01067 filed Jul. 4, 1990 by Heinz Rinder, Rolf Bohme, Gunther Gleim and Elke Rosch and titled Electrical Switching Circuit.

This invention is directed to an electric switching circuit for stabilizing the transfer impedance of several current-to-voltage converters (transformers), the parameters of which vary because of the influence of external factors.

U.S. Pat. No. 4,074,146 describes a power supply which regulates the current output of several current sources which are wired in parallel to feed a common variable load. Several current sources are wired in parallel to supply current to a greatly varying load resistance, for example, a data processing installation. The voltage drop at the load resistance is detected and added to a reference voltage in a summing unit. The output voltage of the summing unit is amplified in an amplifier the output of which is connected to the control input terminals of all the current sources. The output voltage of the amplifier therefore serves to regulate all the current sources. As the voltage drop at the load is added to a reference voltage, the load simultaneously serves as a precision measuring resistor.

The transfer impedance of a current-to-voltage transformer (IU), depends on the temperature and other influencing factors. On the one hand, the temperature dependence in integrated circuits is particularly strongly pronounced owing to the great changes in diffused or implanted resistors. On the other hand, it is frequently necessary to ensure a high stability for the transfer impedance of an IU transformer. This is true, for example, for the integrated circuit of a compact disk player for vehicles, which must be capable of functioning over a temperature range of −20 through +70 degrees Celsius and must be very stable.

It is an object of the invention to suppress the drift of the transfer impedance in an electric circuit having several IU transformers. The invention solves this task in that, to regulate the transfer impedance of the IU transformers to a constant value, one of the IU transformers is provided as a reference IU transformer. The transfer impedance of the reference IU transformer is compared with a reference impedance in a comparator, and a reference voltage is applied to a reference resistance, which is proportional to the transfer impedance of the IU transformers, to produce a reference current which is also applied to the comparator. The output signal from the comparator is fed to each IU transformer to regulate the transfer impedance of the IU transformers to a constant value.

Figure 5A:
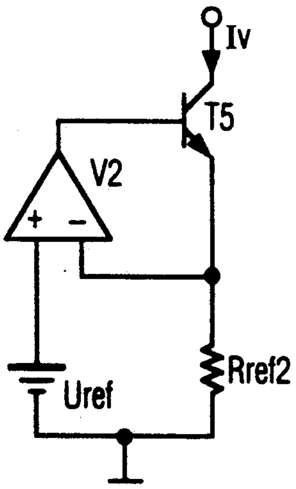

FIG. 5*a* illustrates how current is generated for balancing the voltage.

Figure 5B:
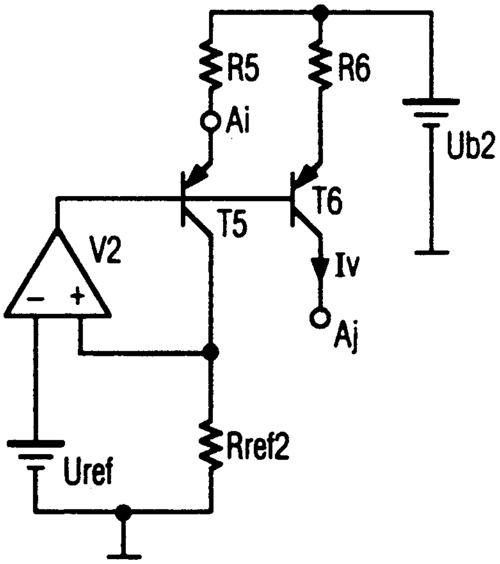

FIG. 5*b* illustrates how current is generated in the opposite direction for balancing the voltage.

Figure 6:
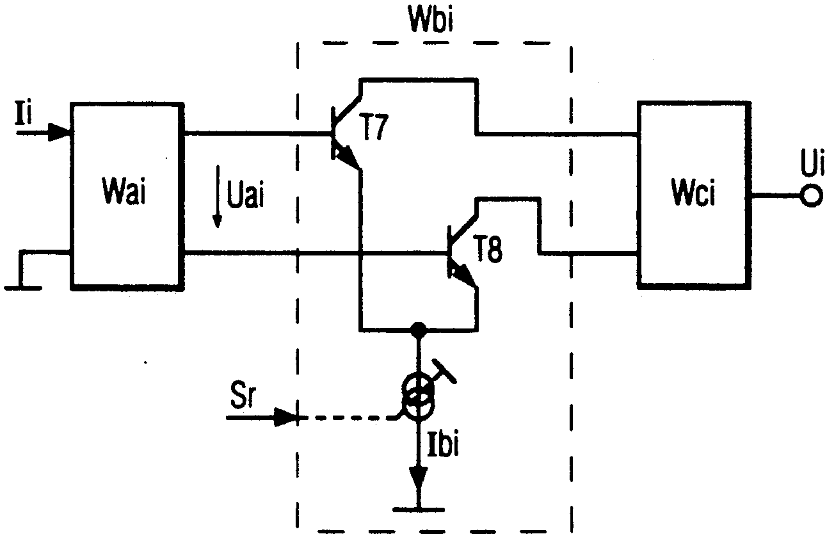

FIG. 6 illustrates how the IU transformer is divided into an input stage, a control stage, and an output stage.

Figure 7:
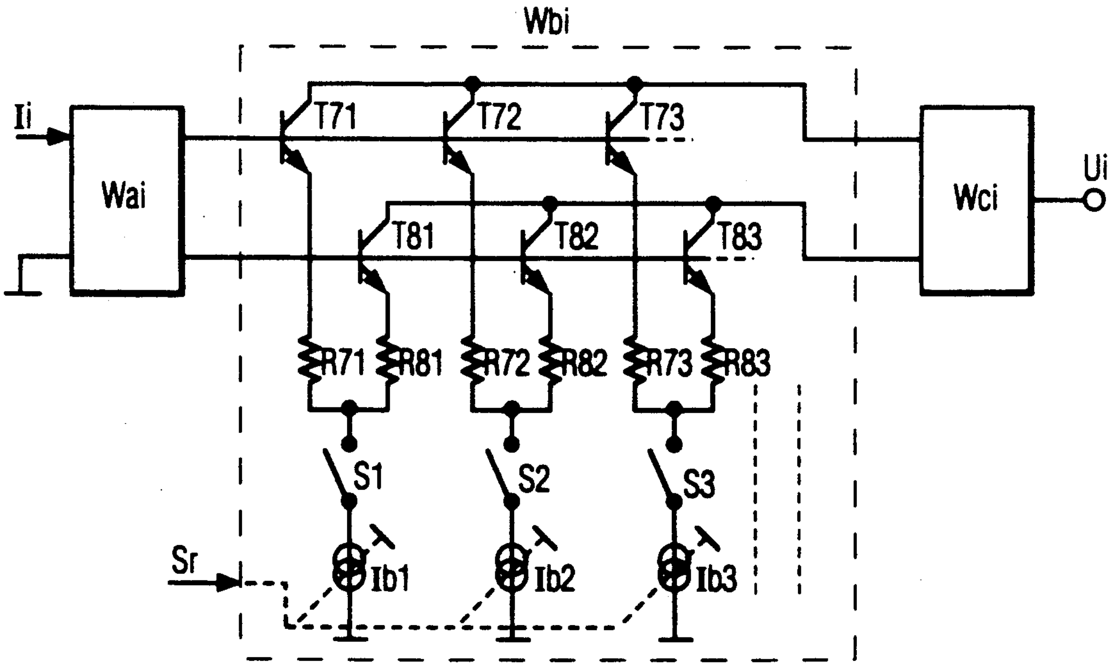

FIG. 7 illustrates an IU transformer with a discretely controlled transfer impedance.

Figure 1:
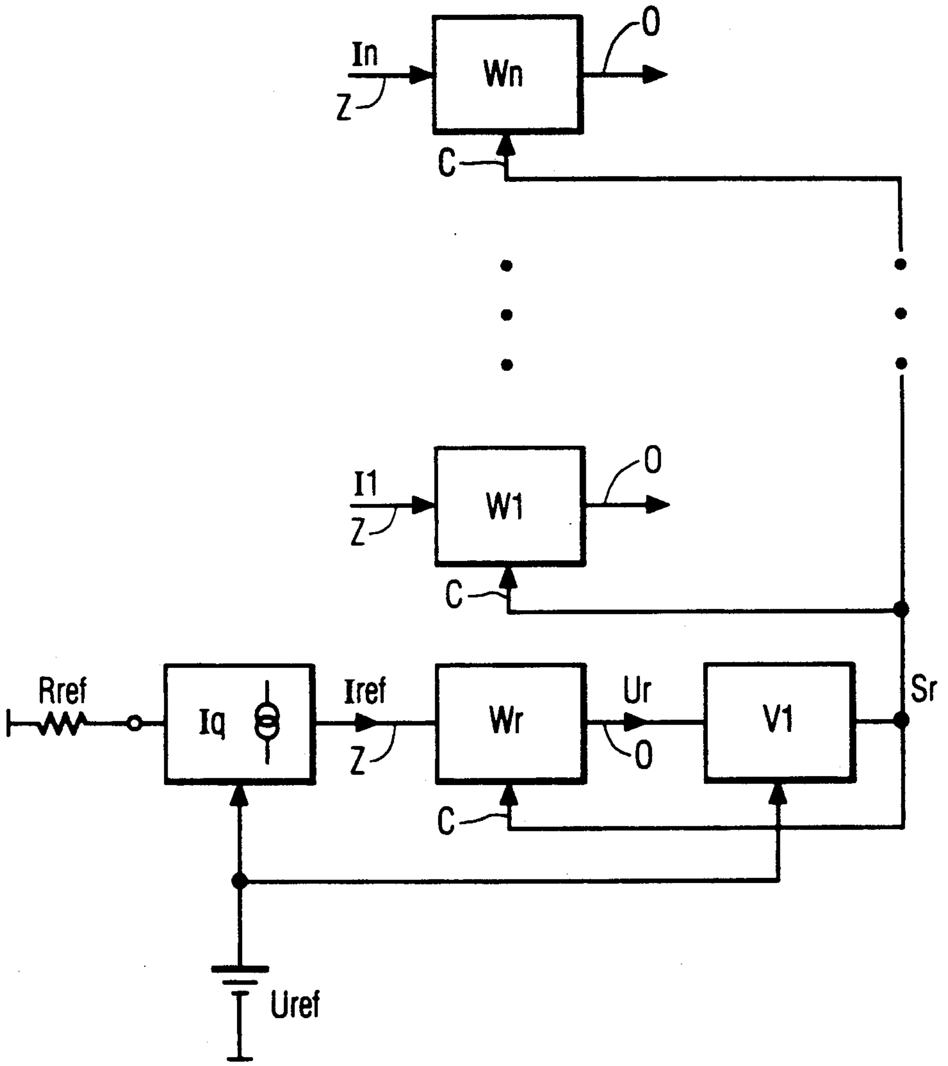
FIG. 1 is a preferred embodiment of the invention.

The integrated circuit shown in FIG. 1 contains a plurality of IU transformers Wr, W1, . . . , Wn. Each transformer has a current-sensitive and preferably low-ohm input terminal Z, a voltage-carrying output terminal O, and a control input terminal C. A reference current $I_{ref}$ is generated in a source $I_q$ of reference current using a source of reference voltage $U_{ref}$ and a reference impedance $R_{ref}$. The reference current $I_q$ is forwarded to the input terminal Z of a reference transformer Wr. The first input terminal of a comparator V1 is connected to the output terminal O of reference transformer Wr and its second input terminal to the source of reference voltage $U_{ref}$. The control input terminals C of IU transformers Wr, W1, . . . , Wn are connected to the output terminal of comparator V1.

A reference current $I_{ref}=K1 * U_{ref}/R_{ref}$, where K1 is a constant factor, is generated in source $I_q$ of reference current. Reference transformer Wr generates an output voltage $Ur=I_{ref}* Rr$, where Rr is the transfer impedance of reference transformer Wr, from the incoming reference current $I_{ref}$. Comparator V1 generates at least approximately an output signal $Sr=V * (Ur-K2 * U_{ref})$, where K2 is a constant factor and V is the amplification. In a sufficiently amplified stable system, $Ur-K2 * U_{ref}=0$. From the foregoing equations, it is seen that $Rr-R_{ref} * K2/K1$. Since the control signal Sr causes reference transformer Wr to assume a transfer impedance $Rr=R_{ref}* K2/K1$, all the other transformers W1 to Wn will, if they have the same properties as reference transformer Wr, adjust to the same transfer impedance $R1=R2= \ldots Rn=Rr$. The prerequisite for the equivalence of all the IU transformers with respect to the dependence of individual parameters on external factors can be satisfied relatively well inside a single integrated circuit by similar design, close similarity, and low temperature gradients. The stability of reference voltage $U_{ref}$ is not involved because it is not part of the alignment situation.

Figure 2:
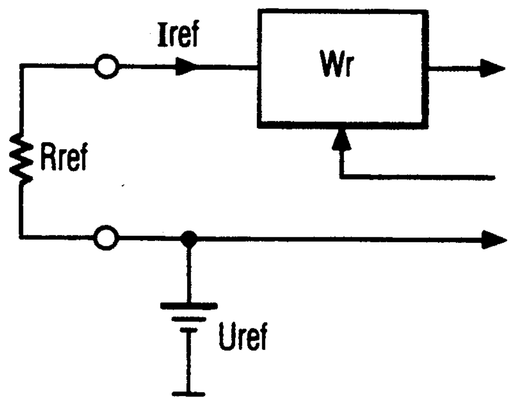
FIG. 2 illustrates a simple way of generating a reference voltage.

FIG. 2 shows a simple way of generating reference current $I_{ref}$. Reference impedance $R_{ref}$ is between the source of reference voltage $U_{ref}$ and the input terminal of reference transformer Wr. The potential at the input terminal of IU transformer must accordingly equal the potential at the ground terminal. If reference impedance $R_{ref}$ is connected externally, the integrated circuit will require two connections.

Figure 3:
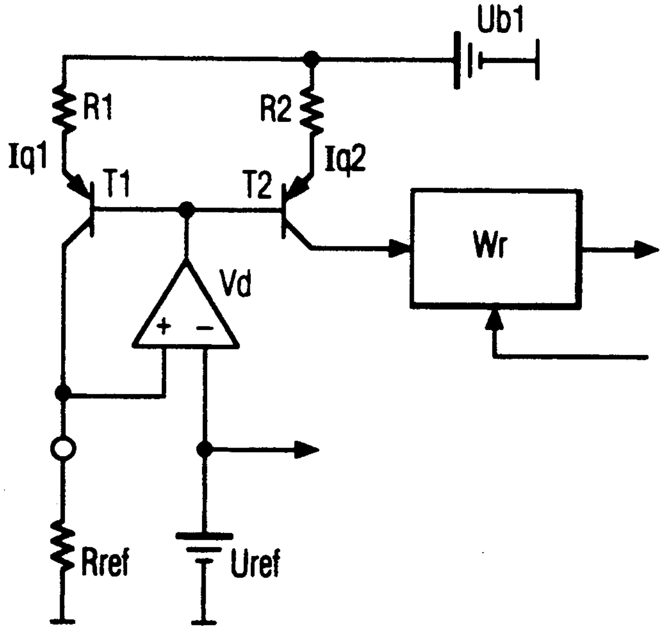
FIG. 3 illustrates generating a reference voltage from synchronous sources.

The system illustrated in FIG. 3 is more advantageous. A differential amplifier Vd controls two sources Iq1 and Iq2 of current, here in the form of two transistors T1 and T2 with emitter resistors R1 and R2. The output terminal of differential amplifier Vd is connected to the bases of transistors T1 and T2. Emitter resistors R1 and R2 are connected to a common voltage source Ub1. The collector of transistor T1, which is equivalent to the output terminal of first source Iq1 of current, is connected to reference impedance $R_{ref}$ and to the first input terminal of differential amplifier Vd. The collector of second transistor T2, which is equivalent to the output terminal of second source Iq2 of current, is connected to the input terminal of reference transformer Wr. In order for the amplification of differential amplifier Vd to be high enough, the voltage drop at reference impedance $R_{ref}$ must equal reference voltage $U_{ref}$. The requisite current is supplied by the first source Iq1 of current. The current $I_{ref}$ is supplied to the input terminal of reference transformer Wr by second source of current Iq2. Current sources Iq1 and Iq2 can be dimensioned such that their currents will be equal or, what is advantage in a sensitive IU transformer, such that current $I_{ref}$ will be a fraction K1 of the current traveling through reference impedance $R_{ref}$.

An external reference impedance results in better stabilization than is possible with a chip-internal impedance. It also makes it possible to compensate for copy-specific leakage from the signal sources supplying the IU transformers by adjusting the reference impedance.

Figure 4:
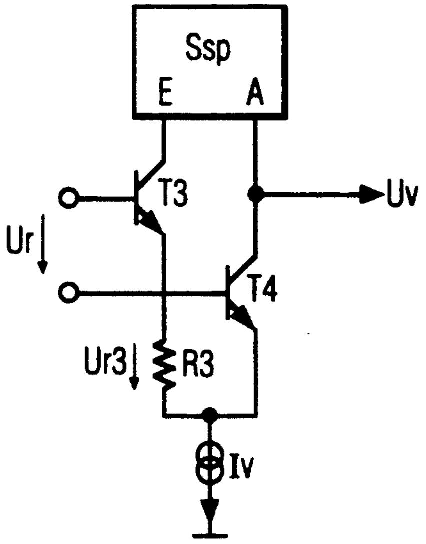
FIG. 4 illustrates how the reference voltage is balanced.

Symmetrical signals are preferred in a bipolar integrated circuit. In such an instant reference IU transformer Wr provides output signals Ur, of opposite polarities to two output terminals, whereby the synchronization voltage of both terminals can depend on temperature or other external factors. It is therefore necessary to compare the symmetrical output signal Ur from reference IU transformer Wr with the unsymmetrical reference voltage $U_{ref}$. This can be done as illustrated in FIG. 4 with a differential stage comprising two transistors T3 and T4 supplied from one source Iv of current that depends on reference voltage $U_{ref}$. Upstream of transistor T3 is an emitter resistor R3. The bases of transistors T3 and T4 are connected to the output terminals of IU reference transformer Wr, IU Wr is not shown in FIG. 4. The collectors of transistors T3 and T4 are connected to a current mirror Ssp. A signal Uv is obtained from the output terminal A of current mirror Ssp and changed by an output amplifier, for example into a control signal Sr. The function of this part of comparator V1 derives from the fact that equal currents Iv/2 will flow through the two branches with transistors T3 and T4 if the mirror has a reflection coefficient of one and when the control loop is compensated and that voltage Ur must accordingly equal the voltage drop Ur3 through resistor R3.

The current Iv shown in FIG. 5 is generated from a reference voltage $U_{ref}$. The differential amplifier V2 in FIG. 5*a* has one input terminal connected to one pole of the source of reference voltage $U_{ref}$, another input terminal connected to one side of a reference resistor $R_{ref}2$, and an output terminal connected to the base of a current-source transistor T5. The emitter of current-source transistor T5 is connected to the second input terminal of differential amplifier V2. The other side of the source of reference voltage $U_{ref}$ and the other connection of reference resistor $R_{ref}2$ are connected to at a reference potential, ground for example.

When the amplification of differential amplifier V2 is sufficiently high, the voltage drop at reference resistor $R_{ref}2$ equals the reference voltage $U_{ref}$. The current that can be derived from the collector of current-source transistor T5 will then correspond, even down to the low base current, to the current traveling through reference resistor $R_{ref}2$. When higher demands are made, current-source transistor T5 can be replaced with a Darlington circuit with two transistors. When for example $R3 = 2^* R_{ref}2$, the voltage drop over R3 will, due to the halving of current Iv, equal reference voltage $U_{ref}$. Depending on the ratio between impedances, auxiliary voltage Ur3=Ur can be any voltage desired. Changing resistors $R_{ref}2$ and R3 in the same direction will leave voltage Ur unchanged because all that is important is the ratio of resistors $R3/R_{ref}2$. The result is a very low temperature dependence on the part of the integrated circuit.

The circuit illustrated in FIG. 5*b* differs from the one illustrated in FIG. 5*a* in the position of current-source transistor T5, the collector of which is connected to the second input terminal of differential amplifier V2, whereas its emitter constitutes current-source output terminal Ai. Whereas the second input terminal of the differential amplifier V2 illustrated in FIG. 5*a* is of the inverting type, the one illustrated in FIG. 5*b* must be non-inverting. FIG. 5*b* also shows how a current source can be created in the opposite direction. A resistor R5 is interposed between output terminal Ai and a voltage source Ub2. The base of another transistor T6 is connected to the output terminal of differential amplifier V2. A resistor R6 is arranged between voltage source Ub2 and the emitter of transistor T6. The output current Iv in the opposite direction is obtained at the collector of transistor T6, which is designated output terminal Aj.

The object of stabilizing several IU transformers while maintaining various transfer impedances can also be attained in accordance with the invention. As illustrated in FIG. 6, a differential stage with bipolar transistors T7 and T8 that acts as a controlled mechanism is provided inside the IU transformer. The ith IU transformer comprises an input stage Wai, a differential stage Wbi, and an output stage Wci. Input stage Wai transforms the input current Ii into a voltage Uai. The differential stage Wbi comprises bipolar transistors T7 and T8, the bases of which are connected to the output terminals of input stage Wai, the emitters of which are connected to a current source Ibi, and the collectors of which are connected to the input terminals of output stage Wci. Output stage Wci generates an output voltage Ui from the collector currents in differential stage Wbi.

Operation depends on the slope of the differential stage, and hence its amplification, being proportional to the current from source Ibi. To ensure that the ith transformer Wi will have K times as much transfer impedance as reference transformer Wr has, current Ibi must be K times the current Ibr of reference transformer Wr. The necessary circuitry is known and accordingly does not need to be specified here. The possibility of making the factor K variable and hence controllable is accordingly included.

One way of making the transfer impedance discretely controllable, and hence programmable, is illustrated in FIG. 7. Several differential stages comprising bipolar transistors T71 and T81, T72 and T82, T73 and T83, etc. are connected at the input terminal to input stage Wai and at the output terminal to output stage Wci. They are supplied by current sources Ib1, Ib2, Ib3, etc., which can be turned on and off by controllable switches S1, S2, S3, etc. If the transistors T71 and T81, T72 and T82, T73 and T83, etc. in the differential stages have emitter resistors R71 and R81, R72 and R82, R73 and R83, etc., the linearity and other properties will be better.

The slope of differential stage Wbi is derived from the sum of the slopes of the differential stages involved. The slope can thus be varied in stages by way of control switches K1, K2, K3, etc. It is of particular advantage to select current IbU, Ib2, Ib3, etc. in accordance with a series of base-two powers. If there are emitter resistors, they must be inversely assigned. It is also recommended to stack the surfaces of transistors T71 and T81, T72 and T82, etc., again in relationship with the currents, to obtain the greatest precision and stability.

We claim:

1. In a system including a plurality of current-to-voltage converters, an improvement for regulating the transfer impedance of said current-to-voltage converters to a substantially equal value comprising:

a reference voltage source and a reference current source having a reference impedance responsive to said reference voltage source for providing a reference current;

a reference current-to-voltage converter responsive to said reference current for providing an output voltage;

a comparator responsive to said reference voltage and said output voltage for providing a control signal to said reference current-to-voltage converter and to said plurality of current-to-voltage converters for maintaining the transfer impedance of said current-to-voltage converters constant.

2. The system of claim 1 further including a differential amplifier and a plurality of transistors, a first input terminal of said differential amplifier being responsive to said reference voltage and a second input terminal of said differential amplifier being responsive to said reference impedance, the bases of said transistors being responsive to the output terminal of said differential amplifier, and said reference current-to-voltage converter being responsive to one of said transistors.

3. The system of claim 2 further including a voltage source connected to the emitters of said transistors, and wherein the collector of one of said transistors is connected to said reference impedance and the collector of the other transistor is connected to said reference current-to-voltage converter.

* * * * *